United States Patent [19]
Koehly et al.

[11] Patent Number: 4,749,519
[45] Date of Patent: Jun. 7, 1988

[54] PROCESS FOR THE RECOVERY OF PLUTONIUM CONTAINED IN SOLID WASTE

[75] Inventors: Gérard Koehly, Bievres; Jacques Bourges, Verrieres le Buisson; Charles Madic, Thiais; Michael Lecomte, Gif-Sur-Yvette, all of France

[73] Assignee: Commissariat a l'Energie Atomique, Paris, France

[21] Appl. No.: 47,635

[22] Filed: May 7, 1987

Related U.S. Application Data
[63] Continuation of Ser. No. 711,191, Mar. 13, 1985, abandoned.

[30] Foreign Application Priority Data
Mar. 27, 1984 [FR] France ................ 84 04764

[51] Int. Cl.[4] .............. C25C 1/22; G21C 19/44; G21C 19; G21C 46; G21F 9/00
[52] U.S. Cl. ................................ 252/627; 204/1.5; 252/626; 423/20; 423/251
[58] Field of Search ................. 252/626, 627; 423/251, 423/20, 6, 7, 22, 49; 204/1.5, 105, 109, 253, 402

[56] References Cited
U.S. PATENT DOCUMENTS
| | | | |
|---|---|---|---|
| 3,490,999 | 1/1970 | Raviv et al. | 204/1.5 |
| 3,669,631 | 6/1972 | Dietrich et al. | 23/342 |
| 3,891,741 | 6/1975 | Carlin et al. | 423/2 |
| 3,922,231 | 11/1975 | Carlin et al. | 204/1.5 |
| 3,948,735 | 4/1976 | Hayden et al. | 204/1.5 |
| 3,976,775 | 8/1976 | Tallent | 423/251 |
| 4,021,313 | 5/1977 | Hausberger et al. | 204/1.5 |
| 4,069,293 | 1/1978 | Tallent | 423/3 |

FOREIGN PATENT DOCUMENTS
| | | |
|---|---|---|
| 2619089 | 11/1976 | Fed. Rep. of Germany . |
| 2929122 | 2/1981 | Fed. Rep. of Germany ....... 204/1.5 |
| 847641 | 9/1960 | United Kingdom . |

OTHER PUBLICATIONS
Ryan et al., 1979, *Dissolution of Plutonium Dioxide-A Critical Review*, Pacific Northwest Laboratory, ACS Symposium Series 117, pp. 499–514.

*Primary Examiner*—Stephen J. Lechert, Jr.
*Assistant Examiner*—Howard J. Locker
*Attorney, Agent, or Firm*—Pearne, Gordon, McCoy & Granger

[57] ABSTRACT

The invention relates to a process for recovering the plutonium contained in the solid waste, such as process, technological and laboratory waste.

The waste is contacted with aqueous nitric acid solution having a nitric acid concentration of 2 to 8 mole/l, which contains a compound of $Ag^{2+}$ soluble in the solution, for oxidizing the plutonium present in the waste and for dissolving same in the nitric solution.

Preferably, contacting takes place in an electrolytic cell having an anode and a cathode, by applying a potential difference between anode and cathode which is sufficient to continuously regenerate the $Ag^{2+}$ ions used for oxidizing the elements present in said waste.

11 Claims, 1 Drawing Sheet

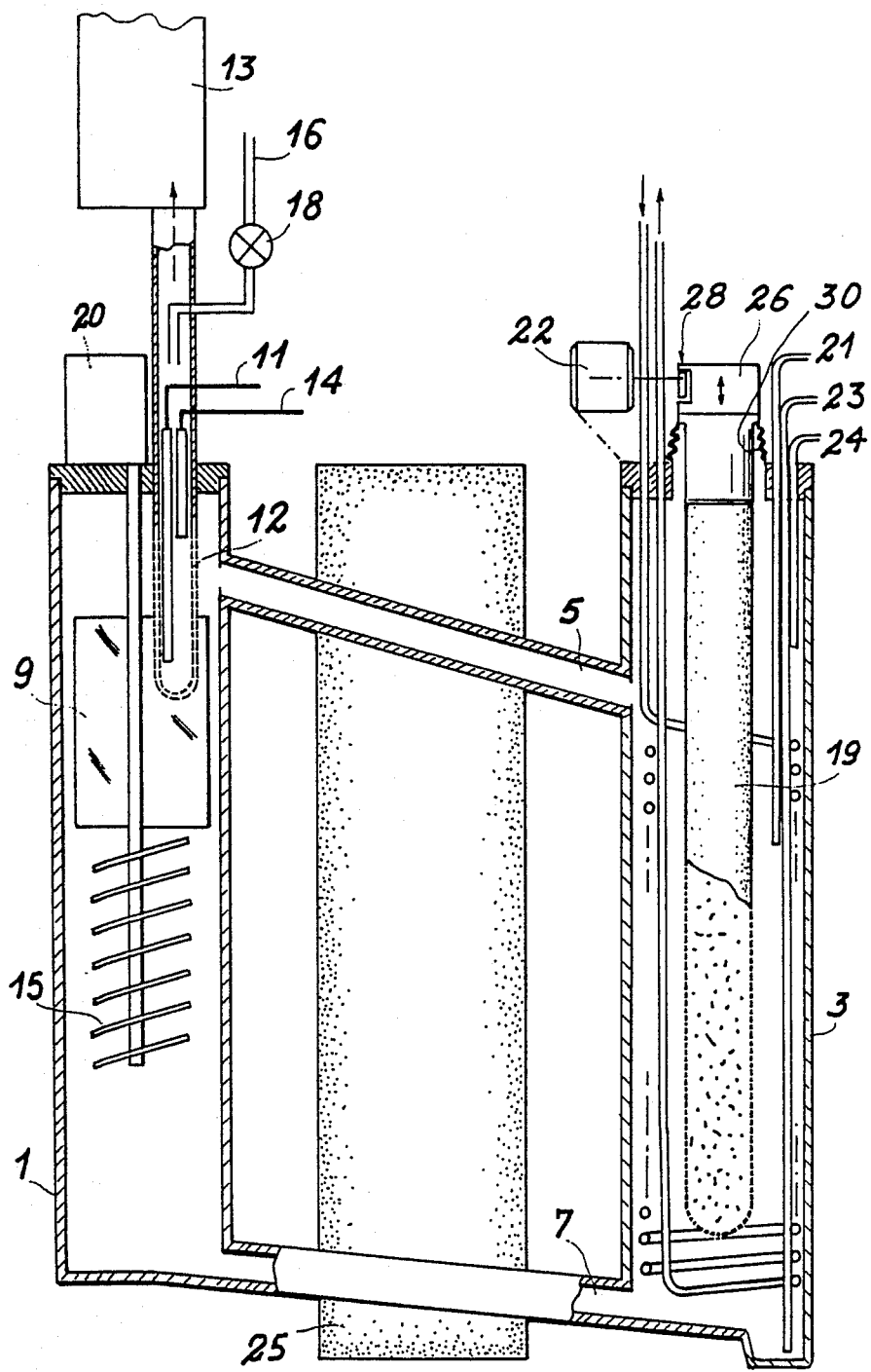

PROCESS FOR THE RECOVERY OF PLUTONIUM CONTAINED IN SOLID WASTE

This is a continuation, of application Ser. No. 711,191, filed Mar. 13, 1985 (now abandoned).

BACKGROUND OF THE INVENTION

The present invention relates to a process for recovering the plutonium contained in solid waste, such as process, technological and laboratory waste.

It is known that one of the problems frequently encountered in nuclear installations is that of recovering the plutonium and/or neptunium present in the solid waste resulting either from the production of nuclear fuel elements or from the processing of the irradiated nuclear fuel. Such waste can be constituted by ash resulting from the incineration of highly plutonium contaminated fuel waste to 800° to 900° C. so that calcined ash is obtained in which the plutonium is in the form of oxide or other refractory compounds, i.e. a form which is difficult to recover in solution. Solid waste is also obtained, which contains plutonium in oxide form during the decanning of irradiated nuclear fuel elements, because a by no means negligible plutonium oxide quantity remains fixed to the fuel can sections. Finally, certain laboratory waste, particularly that based on plastic materials can also be contaminated by plutonium oxide, which it is difficult to recover by dissolving.

Hitherto, the most frequently used method for dissolving the plutonium oxide contained in the waste, such as the incineration ash of fuel waste, was based on the catalytic effect of fluoride ions making it possible to dissolve the plutonium in nitrohydrofluoric solution. This, in such waste, the main and most disturbing impurity is silica, which should be eliminated as from the start of processing. To this end, the ash is treated cold for 24 hours in 10N hydrofluoric acid in order to bring about a maximum solubilization of the silica. This is followed by subjecting the residue to the action of a mixture of 6M of nitric acid and 2N hydrofluoric acid in boiling form. This is followed by the expulsion of the final traces of silica in the form $SiF_6H_2$, which distils and finally the plutonium fluoride is solubilized by a mixture of 4M nitric acid and 1M aluminium nitrate at boiling.

Thus, this method requires the use of very corrosive reagents and leads to the production of highly fluorinated effluents, whose treatment causes problems.

Consideration has also been given to the recovery of the plutonium contained in waste by aluminothermy, i.e. by reducing the plutonium oxide with aluminium, which leads to an alloy PuA1, which can then be dissolved in a $HNO_3$—HF medium. However, this method does not give satisfactory results, because the recovery level of the plutonium or uranium contained in the ash does not exceed 50%. It is also possible to recover the plutonium by alkaline fusion in a bath of $Na_2O_2$ and NaOH. After fusion, the vitreous mass containing the plutonium is immersed in water which is acidified with a nitric acid excess in order to recover the plutonium in the solution. However, the solution obtained is not stable, and at the end of a certain time a flaky white $SiO_2$ precipitate forms in the solution and partly entrains the plutonium.

Consideration can also be given to the conversion of the plutonium oxide contained in the ash into plutonium hexafluoride by reacting with gaseous fluorine, but in this case, in view of the considerable reactivity of the ash, the latter tends to solidify and it is not possible to obtain a satisfactory plutonium recovery level.

Thus, none of the presently known processes makes it possible to recover the plutonium from waste under satisfactory conditions.

SUMMARY OF THE INVENTION

The present invention relates to a process for the recovery of plutonium contained in solid waste, making it possible to obtain recovery levels exceeding 95%, without requiring the use of highly corrosive solutions.

The inventive process for the recovery of plutonium contained in solid waste consists of contacting said solid waste with an aqueous nitric acid solution with a nitric acid concentration of 2 to 8 mole/l and which contains a $Ag^{2+}$ compound which is soluble in the solution, for a time sufficient to oxidize the plutonium present in the waste by means of the $Ag^{2+}$ ions.

Thus, the $Ag^{2+}$ ions are oxidizing agents able to oxidize numerous elements and dissolve the same. In the case of plutonium in oxide form, the oxidation by $Ag^{2+}$ corresponds to the following reaction diagram:

$$Ag^{2+} + PuO_{2(S)} \rightarrow PuO_2^+ + Ag^+ \qquad (1)$$

$$Ag^{2+} + PuO_2^+ \rightarrow PuO_2^{2+} + Ag^+ \qquad (2)$$

Reactions (1) and (2) have very high kinetics, which leads to a virtually instantaneous dissolving of the plutonium. Generally, contacting takes place accompanied by stirring, in order to aid contacts between the $Ag_{2+}$ ions and the plutonium present in the waste.

According to a preferred embodiment of the process according to the invention, said contacting is carried out in an electrolytic cell having an anode and a cathode and the solution is stirred, whilst applying a potential difference between anode and cathode which is adequate to continuously regenerate the $Ag^{2+}$ ions, which are used for oxidizing the oxidizable elements present in the waste.

Thus, there is a continuous electrolytic regeneration of the $Ag^{2+}$ ions consumed, in order to oxidize the plutonium and other oxidizable elements, on the basis of the following reaction diagram:

$$2Ag^+ + 2e \rightarrow 2Ag^{2+} \qquad (3)$$

This $Ag^{2+}$ ion regeneration reaction (3) takes place on an anode of the cell and in order to obtain a maximum plutonium dissolving rate, this is facilitated by stirring the solution, in order to limit the diffusion layer at the anode and increase the contacts between the $Ag^+$ ions and the anode.

The process according to the invention is very advantageous compared with the prior art, processes. Thus, it makes it possible to easily overcome the presence of fluoride ions whilst permitting working solely in a nitric medium and at ambient temperature, which permits the use of stainless steel equipment. Moreover, it makes it possible to bring about the dissolving of the plutonium with a high efficiency level of approximately 98±2%, by using relatively short treatment periods of approximately 1 to 6 hours.

When the solid waste to be treated contains chlorides, the solid waste firstly undergoes a chloride elimination treatment, before contacting same with the aqueous nitric acid solution.

Thus, in the process according to the invention, it is important not to have chloride ions in solution, because they would bring about the precipitation of the $Ag^+$ ions and to the same extent would reduce the silver concentratiton of the solution and the dissolving rate of the plutonium.

Advantageously, the elimination of the chlorides takes place by washing the solid waste with water, which makes it possible to eliminate 90% of the chlorides without any significant plutonium loss (approximately 0.02%. Generally, the waste is washed three times with water using a proportion of approximately 25 ml of water per gramme of waste.

For performing the process according to the invention, the nitric acid concentration of the aqueous solution is preferably 4 to 6 mole/l, because the solubility of the silver (II) increases with the nitric acid concentration. Generally the silver (II) compound is silver oxide AgO.

Working preferably takes place at a temperature of 20° to 40° C., in order to obtain a satisfactory dissolving rate, whilst retaining an adequate stability of the $Ag^{2+}$ ions with respect to the parasitic reaction of oxidation of the water by the $Ag^{2+}$ ions, whose speed increases with the temperature.

Widely varying silver concentrations can be used and the concentration is more particularly chosen as a function of the dissolving rate which it is wished to achieve, because the latter increases with the silver content of the aqueous solution.

In general, use is made of silver concentrations between $10^{-2}$ and $10^{-1}$ mole·l$^{-1}$. Moreover, in order to aid the regeneration of the $Ag^{2+}$ ions in solution, preference is given to the use of an anode with a relatively large surface compared with the volume of the solution to be treated.

The stirring of the solution is also an important element for increasing the dissolving rate, because it makes it possible to increase the contacts on the one hand between the $Ag^+$ ions and the anode and on the other hand between the $Ag^{2+}$ ions and the solid waste to be treated. Stirring can be carried out magnetically, mechanically and/or ultrasonically. However, a simultaneous mechanical and ultrasonic stirring has proved to be more effective than mechanical stirring alone.

In the process according to the invention, the phenomena which probably limit the dissolving rate of the plutonium present in the waste are linked on the one hand with the regeneration of the $Ag^{2+}$ ions and on the other with the diffusion rate of said $Ag^{2+}$ ions in the solid waste for reaching the plutonium to be dissolved.

In order to assist contacts between the $Ag^{2+}$ ions and the plutonium present in the waste, vigorous stirring of the solution is necessary. Moreover, the ratio between the volume of the solution and the mass of the treated waste also plays an important part and generally use is made of a relatively high ratio of approximately 10 to 20 ml of solution per gramme of waste. Finally the grain size of the treated waste also influences the dissolving rate. In the case of ash, use is advantageously made of grain sizes below 1 mm.

In order to increase the $Ag^{2+}$ ion regeneration rate, use is made of an anode having a relatively large surface in order to aid contacts between the $Ag^+$ ions and the anode and an appropriate anode current density is chosen, because the dissolving rate increases with this current density. In general, use is made of an anode current density which is always above 1 $mA \cdot cm^{-2}$ of anode surface.

DESCRIPTION OF THE DRAWING AND THE PREFERRED EMBODIMENTS

Other features and advantages of the invention can best be gathered from the following non-limitative embodiments with reference to the attached drawing, which diagrammatically shows in vertical sectional form a dissolving apparatus for performing the process according to the invention.

It can be seen that the dissolving apparatus comprises a first tube 1 and a second tube 3, having identical diameters, connected by pipes 5 and 6, arranged so as to permit the circulation (in the direction of the arrows) of the mixture of waste and solution from second tube 3 to first tube 1 through the overflow pipe 5 and from the first tube 1 to the second tube 3 of pipe 7. The two tubes 1 and 3 have a reliable geometry and can e.g. have a diameter of 16 cm and a total height of 1m, which corresponds to a useful capacity of 20 liters. Tubes 1 and 3 can be made from plexiglass, tantalum or glass.

The first tube 1 has desired means for ensuring electrolysis, stirring of the mixture and the trapping of the gases produced during electrolysis. Thus, the first tube 1 comprises an anode 9, which is preferably cylindrical in order to have a large surface area, as well as a cathode 11 arranged in a cathode compartment 12 partly defined by a porous wall of electrically insulating material and connected to a gas washing column 13. Thus, the gaseous products formed on the cathode (nitrous products and hydrogen) are trapped and entrained after dilution in air through a washing column, whose function is the retention of the nitrogenous products, the hydrogen being evacuated by the ventilation of the confinement enclosure housing the apparatus.

For example, the cathode compartment can have a diameter of 5 cm and a volume of approximately 0.5 liters, whilst it is equipped with a level detector 14 and a pipe 16 for introducing an electrolyte into the cathode compartment 12. Pipe 16 has a valve 18 dependent on the level detection means 14 in the compartment in order to control the opening of valve 18 when the level is below the desired value and to open valve 18 when the liquid level reaches the desired value. The cathode compartment faces pipe 5, which makes it possible to facilitate the evacuation of the calories given off in said compartment by the mixture flow entering pipe 5. A turbine 15, which can be driven by an electric motor 20, makes it possible to ensure the stirring and circulation of the solid - liquid mixture between tube 1 and 3. The second tube 3 is provided with means for holding back the solid waste and means for ensuring the cooling of the mixture.

The means which makes it possible to hold back the solid waste are constituted by a filtering basket 19 and the cooling means are constituted by a coil 17 surrounding basket 19 and through which passes a cooling liquid. The basket 19 can be vertically reciprocated, under the action of the motor 22, whose shaft is connected to the plug 26 of the basket by a cam 28. Sealing is ensured with a bellows 30.

A pipe 23 issuing into the lower part of the second tube 3 ensures the drawing off of the solution obtained and said second tube 3 is also provided with a pipe 24 for introducing reagents, either silver oxide or nitric acid.

The second tube 3 is also provided with means 21 for detecting the end of the reaction and these means are advantageously constituted by a probe for measuring the density of the liquid or a probe for measuring the silver concentration of the solution.

In order to improve security, the apparatus also has a screen 25 made from neutrophage material, e.g. plaster or boron-containing polythylene arranged between the two tubes 1 and 3.

Funnel or basket 19 is advantageously of the vibrating type, which makes it possible to distribute the waste supply over a time ranging between ⅓ and ⅔ of the total dissolving time.

The end of reaction detection means 21 can comprise an optical probe able to register the colouring of the silver (II), which indicates that the silver ions are no longer used for oxidizing the plutonium or other elements present in the waste. It is also possible to use a probe for measuring the density of the liquid, because the end of the reaction can be indicated by obtaining a stable density. It is also possible to use a probe for measuring the gaseous emission on the anode.

The means 23 for drawing off the solution comprise a discharge pipe, which issues at the lower end of the second tube.

The turbine 15 is the first tube 1 can be replaced by a pipe or other appropriate means making it possible to ensure vigorous stirring in the first tube and the circulation of the mixture from the first tube to the second tube in the direction indicated by the arrows.

The porous separating wall of cathode compartment 12 can be made from fritted glass or from a fritted ceramic material, e.g. fritted alumina. In general, the solution used in cathode compartment 12 is a 8N nitric acid solution.

The following examples illustrate the invention in a non-limitative manner.

EXAMPLE 1

This example illustrates the dissolving of the plutonium contained in incineration ash consisting of approximately 30 mg of Pu, 100 mg of chloride, 125 mg of phosphorus and 268 mg of silica per gramme of ash, which also contains other solubilizable elements, such as Zn, Pb, Al, Sn, Fe, Ni, Cr, Co, B and Mo.

In this example, use is made of a glass electrolytic cell kept at 25° C. and subdivided into two compartments by a fritted glass wall with a porosity of 3. The cathode compartment contains the 8N nitric acid and the cathode is a platinum wire. The anode compartment contains the aqueous nitric solution and the platinum anode is in the form of an approximately 30 $cm^2$ cylinder. Stirring is brought about by a helical teflon propeller stirrer rotating at 1200 r.p.m.$^{-1}$ and located in the anode compartment. Firstly the incineration ash is treated in order to remove the chlorides contained therein by washing with water. The ash is then introduced into the anode compartment of the electrolytic cell, which contains 100 ml of anolyte, constituted by an aqueous solution having a nitric acid concentration of 4 mole/l and a silver concentration of $5.10^{-2}$ mole/l. 5 g of ash are then treated for 90 minutes using a current density of 16 mA·$cm^{-2}$. 10 g of ash can be treated in 3 hours by using a current density of 26 mA·$cm^{-2}$. In both cases, the plutonium dissolving efficiency exceeds 98%.

At the end of this treatment, the residue is separated from the solution by filtering on a fritted material of porosity 4 and this residue is washed several times with 4N nitric acid, in order to desorb the solution fraction retained in the residue. The washing acid is added to the solution contained during the dissolving treatment. It is then possible to separate the plutonium from this solution by liquid—liquid extraction using tributyl phosphate.

EXAMPLE 2

This example uses the apparatus of the attached drawing for treating 1 kg of ash identical to that of Example 1 and under the following conditions:
nitric acid 4 mole/l,
current intensity: 40 A,
anode surface: 1000 $cm^2$,
silver concentration: $5.10^{-2}$ mole/l
anolyte volume: 20 l.

After two hours of treatment, a plutonium dissolving efficiency of 98% is obtained.

EXAMPLE 3

This example illustrates the treatment of 1 kg of shells resulting from the processing of fuel elements of water reactors, in order to recover the plutonium contained therein. Firstly, the shells are washed with 4N nitric acid in order to desorb the plutonium which has been fixed in the outer zirconium oxide layer during the residence of said shell in the fuel dissolving solution. Thus, 6.13 mCi of alpha emitter are eliminated per kg of shells. This is followed by the preparation of 2 liters of aqueous solution having a nitric acid concentration of 4 mole/l and 25 g of silver oxide AgO are added thereto. The shells are then added to 2 liters of solution and, after stirring, the solution is sampled and analyzed. It is found that it contains 1.3 mCi of plutonium per kg of shells. 10 g of the thus treated shells are then removed, calcined and treated in order to dissolve all the residual plutonium. The plutonium content of the solution is then determined and is found to be 0.64 mCi·$kg^{-1}$.

Thus, the treatment according to the invention makes it possible to obtain a plutonium decontamination factor of 3.

EXAMPLE 4

10 g of zircalloy shells containing 2.2 mCi of alpha emitters per kg of shells are calcined at 900° C., in order to convert the zirconium into zirconium oxide $ZrO_2$. After grinding, the thus obtained zirconium oxide is treated with an aqueous solution containing 4 mole/l of nitric acid and $5.10^{-2}$ mole/l of silver in an electrolytic cell using a 20 $cm^2$ anode and a current intensity of 0.5 A. Thus, in 4 h a satisfactory decontamination is obtained. Following this electrolysis, the residual activity of the zirconium oxide is only 0.4 mCi·$kg^{-1}$. Thus, this treatment makes it possible to eliminate an activity of 1.8 mCi·$kg^{-1}$ from the shells.

EXAMPLE 5

This example illustrates the dissolving of plutonium oxide polluting laboratory waste, constituted by polyvinyl chloride, polyethylene, neoprene, latex, glass and cellulose materials.

The waste is firstly treated in a cutter mill in order to fractionate it, so that finally ground waste of surface 10 to 20 $mm^2$ is obtained. 2 kg of ground waste is then introduced into the filtering basket 19 of the apparatus shown in the drawing and said basket is introduced into the second tube 3 of the apparatus, which has been filled beforehand with a 4 mole/l nitric acid solution containing $5.10^{-2}$ mole/l of silver. Motor 20 of stirrer 15 and motor 22 associated with basket 19 are started up and an electrolytic current of 60 A is applied and maintained for 2 hours after obtaining a stationary $Ag^{2+}$ concentration.

At the end of electrolysis, the solution is drawn off through pipe 23 and the waste is allowed to drain. 20 liters of a 4 mole/l nitric acid solution containing $5.10^{-2}$ mole/l of silver $Ag^{2+}$ are then introduced into the apparatus, in order to rinse the waste and complete their decontamination.

The basket 19 is then removed from the apparatus, the ground waste is drained and dried under a hot air current. A new waste charge can then be introduced into the apparatus filled with the solution used for rinsing the previous charge.

In the case of waste having an initial contamination level of 1.6 Ci/t, which corresponds to 54.4 mg of plutonium per 2 kg of waste, at the end of treatment, waste is obtained having a residual activity corresponding to 5% of the initial activity, i.e. 80 mCi/t, which corresponds to 160 uCi per 2 kg of waste. The plutonium recovered in the solution represents 1.52 Ci/t or 3.4 mCi per 20 liters of treatment solution.

What is claimed is:

1. A process for the recovery of plutonium contained in solid waste, comprising the steps of contacting solid waste containing plutonium in the form of a solid oxidizable plutonium compound with an aqueous nitric acid solution having a nitric acid concentration of 2 to 8 mole/l and containing a compound of $Ag^{2+}$ which is soluble in the solution, for a time adequate to oxidize by means of the $Ag^{2+}$ ions plutonium compound present in the waste and to dissolve the same in the solution, said solution being free of fluoride ions sufficient to catalyze nitric acid dissolution of plutonium compound present in the waste, and said plutonium compound being substantially insoluble in said aqueous nitric acid solution in the absence of said $Ag^{2+}$ ions.

2. A process according to claim 1, wherein contacting takes place in an electrolytic cell having an anode and a cathode, the solution is stirred and, between the anode and the cathode, is applied an adequate potential difference for the continuous regeneration of the $Ag^{2+}$ ions used for oxidizing plutonium compound present in the waste.

3. A process according to either of the claims 1 and 2, wherein the waste also contains chlorides and including a first treatment for eliminating chlorides and then introducing the treated waste into the aqueous nitric acid solution.

4. A process according to claim 3, wherein the chloride elimination treatment involves washing with water.

5. A process according to any one of the claims 1 and 2, wherein the $Ag^{2+}$ compound is silver oxide AgO.

6. A process according to any one of the claims 1 and 2, wherein the nitric acid concentration of the aqueous solution is 4 to 6 mole/l.

7. A process according to any one of the claims 1 and 2, wherein said contacting is performed at a temperature of 20° to 40° C.

8. A process according to any one of the claims 1 and 2, wherein the silver concentration of the aqueous solution is $10^{-2}$ to $10^{-1}$ mole/l.

9. A process according to claim 2,
wherein a potential difference is applied between the anode and the cathode of the electrolytic cell such that the anode current density always exceeds 1 mA/cm² of the anode surface.

10. A process according to claim 1, wherein said plutonium compound is a plutonium refractory compound.

11. A process according to claim 1, wherein said plutonium compound is plutonium oxide.

* * * * *